US012466398B2

(12) United States Patent
Do et al.

(10) Patent No.: US 12,466,398 B2
(45) Date of Patent: Nov. 11, 2025

(54) METHOD FOR DETERMINING A TRAJECTORY OF A MOTOR VEHICLE

(71) Applicants: RENAULT S.A.S, Boulogne Billancourt (FR); INRIA, Le Chesnay (FR)

(72) Inventors: Anh-Lam Do, Antony (FR); Thierry Hermitte, Chatou (FR); Christian Laugier, Montbonnot Saint-Martin (FR); Philippe Martinet, Juan les Pins (FR); Luiz-Alberto Serafim-Guardini, Fontenay le Fleury (FR); Anne Spalanzani, Grenoble (FR)

(73) Assignees: AMPERE S.A.S., Boulogne Billancourt (FR); INRIA, Le Chesnay (FR)

( * ) Notice: Subject to any disclaimer, the term of this patent is extended or adjusted under 35 U.S.C. 154(b) by 241 days.

(21) Appl. No.: 18/006,481

(22) PCT Filed: Jul. 21, 2021

(86) PCT No.: PCT/EP2021/070320
§ 371 (c)(1),
(2) Date: Jan. 23, 2023

(87) PCT Pub. No.: WO2022/018110
PCT Pub. Date: Jan. 27, 2022

(65) Prior Publication Data
US 2023/0365131 A1    Nov. 16, 2023

(30) Foreign Application Priority Data
Jul. 23, 2020  (FR) ........................................ 2007743

(51) Int. Cl.
*B60W 30/095*   (2012.01)
*B60W 30/09*    (2012.01)
(Continued)

(52) U.S. Cl.
CPC ........ *B60W 30/0956* (2013.01); *B60W 30/09* (2013.01); *B60W 30/0953* (2013.01);
(Continued)

(58) Field of Classification Search
CPC ............. B60W 30/0956; B60W 30/09; B60W 30/0953; B60W 50/16; B60W 60/0015; B60W 2050/146; B60W 2554/80
See application file for complete search history.

(56) References Cited

U.S. PATENT DOCUMENTS 10,259,452 B2 *  4/2019  Gordon ................. B60W 30/09
2014/0067206 A1   3/2014  Pflug
(Continued)

FOREIGN PATENT DOCUMENTS

DE    10 2008 005 310 A1    7/2009
WO    WO 2017/142917 A1     8/2017

OTHER PUBLICATIONS

2018 IRCOBI Conference Proceedings Listing; https://www.ircobi.org/wordpress/downloads/irc18/default.htm accessed Nov. 7, 2024 (Year: 2018).*

(Continued)

*Primary Examiner* — Donald J Wallace
*Assistant Examiner* — Harrison Heflin
(74) *Attorney, Agent, or Firm* — Oblon, McClelland, Maier & Neustadt, L.L.P.

(57) ABSTRACT

A method for determining a trajectory of a motor vehicle includes identifying a plurality of objects present in the surroundings of the motor vehicle. For each object, the method includes: a) determining a speed of impact between the object of interest and the motor vehicle, b) determining a risk of injury in the event of a collision with the motor vehicle at the determined impact speed, c) determining the probability of a collision resulting in an injury between the (Continued)

object of interest and the motor vehicle, depending on the determined risk of injury. The method subsequently includes determining a plurality of possible trajectories for the motor vehicle, and determining the trajectory to be followed by the motor vehicle by optimising a cost function which depends on the determined collision probabilities and which minimises the risk of collision resulting in an injury between each object and the motor vehicle.

16 Claims, 3 Drawing Sheets

(51) Int. Cl.
  *B60W 50/14* (2020.01)
  *B60W 50/16* (2020.01)
  *B60W 60/00* (2020.01)
(52) U.S. Cl.
  CPC ........ *B60W 50/16* (2013.01); *B60W 60/0015* (2020.02); *B60W 2050/146* (2013.01); *B60W 2554/80* (2020.02)

(56) References Cited

U.S. PATENT DOCUMENTS

| | | | |
|---|---|---|---|
| 2014/0379167 A1* | 12/2014 | Flehmig | G08G 1/16 701/1 |
| 2017/0101093 A1* | 4/2017 | Barfield, Jr. | G08G 1/09675 |
| 2017/0124987 A1* | 5/2017 | Kim | B60R 11/04 |
| 2017/0256071 A1* | 9/2017 | Laugier | G06F 17/18 |
| 2017/0372610 A1 | 12/2017 | Pflug | |
| 2019/0027038 A1 | 1/2019 | Chintakindi et al. | |
| 2019/0066508 A1 | 2/2019 | Pflug | |
| 2019/0185018 A1* | 6/2019 | Tao | B60W 50/14 |
| 2020/0027341 A1* | 1/2020 | Drews | G08G 1/0133 |
| 2020/0047668 A1* | 2/2020 | Ueno | G08G 1/166 |
| 2020/0365030 A1 | 11/2020 | Pflug | |
| 2020/0377085 A1* | 12/2020 | Floyd-Jones | B60W 60/0011 |
| 2021/0107477 A1* | 4/2021 | Kim | B60W 40/02 |
| 2021/0107506 A1* | 4/2021 | Takagi | B60W 30/0953 |
| 2021/0245701 A1* | 8/2021 | Haltom | G06V 40/10 |
| 2021/0339741 A1* | 11/2021 | Rezvan Behbahani | B60W 30/0956 |
| 2023/0015466 A1* | 1/2023 | Jiralerspong | B60W 40/105 |
| 2024/0067510 A1* | 2/2024 | Ulbrich | B66F 9/063 |

OTHER PUBLICATIONS

"A Tool to Assess Pedestrian Safety: Risk Curves by Injury Severity and their Confidence Intervals for Car-to-Pedestrian Front Collision" by S Cuny, H Chajmowicz, K Yong, T Hermitte, E Lecuyer, N Bertholon; https://www.ircobi.org/wordpress/downloads/irc18/pdf-files/40.pdf accessed Nov. 7, 2024 (Year: 2018).*

International Search Report issued Aug. 9, 2021 in PCT/EP2021/070320, filed on Jul. 21, 2021, 2 pages.

French Preliminary Search Report issued Apr. 22, 2021 in French Application 20 07743, filed on Jul. 23, 2020, 3 pages (with English translation of Categories of cited documents).

\* cited by examiner

METHOD FOR DETERMINING A TRAJECTORY OF A MOTOR VEHICLE

TECHNICAL FIELD OF THE INVENTION

The present invention relates generally to vehicle safety, in particular in order to avoid collisions between a vehicle and an object present in its environment or to minimize the severity of the collisions if the latter are unavoidable.

It relates more particularly to a method for determining a trajectory of a motor vehicle.

STATE OF THE ART

Many vehicles are these days equipped with active safety systems that make it possible to assess the environment in which the vehicle is moving. Such systems that can be cited include the driver assistance systems ("Advanced Driver-Assistance Systems" or ADAS) which will activate for example advanced emergency braking (AEB) or the Autonomous Emergency Steering (AES).

If a danger arises in the environment of the vehicle, this type of system generally intervenes only as a last resort, first of all by alerting the driver of the vehicle, then if there is no response therefrom, by correcting the kinematics (speed and/or trajectory) of the vehicle.

New methods for mitigating the risks of collision are developed in order to minimize the severity of the collision when the latter is unavoidable.

In this context, the document EP3342663 describes a pedestrian detection system and a method for mitigating the effects of collision between a vehicle and a pedestrian (detected by the detection system). Based on collected information such as the speed of the vehicle, the distance and the relative distance between the detected pedestrian and the vehicle, the method proposes generating an alert concerning an imminent collision for the attention of the driver. Following this alert, the emergency braking is automatically activated.

The solution proposed in this document suffers from two drawbacks. The first is that it applies only to collisions between the vehicle and pedestrians. The second is that it does not make it possible to limit as much as would be desirable the severity of the injuries in the event of collision.

SUMMARY OF THE INVENTION

The present invention proposes improving the trajectory determination method in the case of a risk of collision by minimizing the overall risk of injury between the motor vehicle and an object present in its environment.

More particularly, according to the invention, a method is proposed for determining a trajectory of a motor vehicle which comprises the steps of, each of the steps being implemented in a computer (140) included in the motor vehicle:

identifying a plurality of objects present in the environment of the motor vehicle,
for each object:
a) determining a speed of impact between the object concerned and the motor vehicle,
b) determining a risk of injury in the event of collision with said motor vehicle at the determined speed of impact,
c) determining a probability of collision resulting in an injury between the object concerned and the motor vehicle, as a function of the determined risk of injury, then
determining a trajectory to be taken by the motor vehicle by optimizing a cost function which depends on the determined probabilities of collision and which makes it possible to minimize the risk of collision resulting in an injury between each object and the motor vehicle.

Thus, the trajectory to be taken by the motor vehicle is determined by taking account of a risk of injury in the event of unavoidable collision. More particularly, for each object present in the environment of the motor vehicle, the probability of collision with injury is taken into account in order to determine a trajectory for the vehicle which minimizes this risk of collision with injury and which, in the event of unavoidable collision, minimizes the injuries.

Other advantageous and nonlimiting features of the method for determining a trajectory of a motor vehicle according to the invention, taken individually or in all technically possible combinations, are as follows:

said probability of collision is a function of the distance separating the motor vehicle and said object, said probability of collision being preferentially calculated as a function of a probability of occupancy of a cell of a grid by said object, said grid comprising a plurality of cells representing the environment of the motor vehicle;

the risk of injury associated with each object is determined as a function of a plurality of data which correspond respectively to probabilities of the injury being more or less serious, each probability depending on the nature of the identified object, the nature of the object being chosen from a set comprising at least the "pedestrian" and "car" elements;

said plurality of data comprises a probability of death, a probability of serious injury and a probability of slight injury;

the risk of injury associated with each object is determined by calculating a weighted sum of the probabilities of death, of serious injuries and of slight injuries associated with the determined speed of impact;

the cost function depends on the kinematic data of the motor vehicle, on the distance between the motor vehicle and each object and on the probabilities of collision determined for each object;

the optimizing of the cost function is performed so as to observe at least one constraint relating to the dynamic characteristics of the motor vehicle;

the step of determining the trajectory to be taken by the motor vehicle is based on a minimizing of the cost function, said cost function being all the higher when the risks of injuries caused in the event of collision are great;

the trajectory to be taken is displayed on a screen inside the motor vehicle intended for its driver and/or is transmitted to an autonomous driving module;

a step of alerting the driver of the motor vehicle is provided, implemented by the computer as a function of the risk of collision or of injuries caused by a collision between an object and the motor vehicle;

the alerting step is performed if the cost function is below a predetermined threshold;

the alerting step comprises the emission of an audible or haptic or visual alert.

Obviously, the various features, variants and embodiments of the invention can be associated with one another according to various combinations in as much as they are not incompatible or mutually exclusive.

DETAILED DESCRIPTION OF THE INVENTION

The description which follows in light of the attached drawings, given as nonlimiting examples, will give a good understanding of what the invention consists of and how it can be produced.

Figure 1:
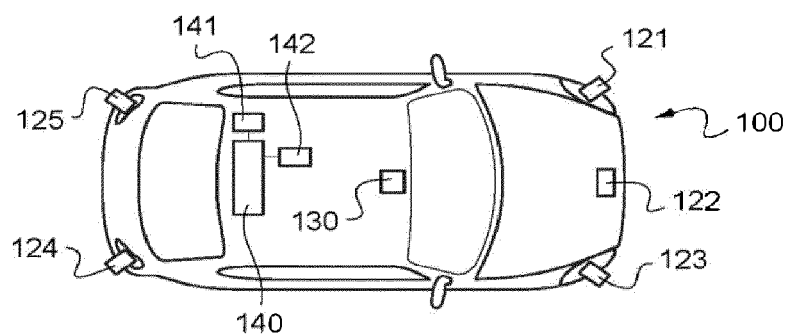
FIG. 1 is a schematic view of a motor vehicle adapted to implement a determination method according to the invention.

In FIG. 1, a motor vehicle 100 is represented seen from above.

As appears in this figure, the motor vehicle 100 is, here, a conventional car, comprising a chassis which is supported by wheels and which itself supports various equipment, including a power train, braking means and a steering unit.

It will be able to be a manually driven vehicle, in which case the latter will be equipped with means for transmitting information to the driver, or an autonomous vehicle. Hereinbelow, it will be considered that it is an autonomous vehicle, that is to say a vehicle that has the capability to move within its environment without intervention from the driver.

This motor vehicle 100 is equipped with sensors allowing it to register itself within its environment so as, for example, to be able to be driven autonomously or to assess its environment.

Any type of sensor could be employed.

In the example represented in FIG. 1, the motor vehicle 100 is equipped with a camera 130 oriented toward the front of the motor vehicle 100 in order to capture images of the environment situated in front of the motor vehicle 100. This camera 130 is, for example, positioned in an upper central part of the windshield in the interior of the motor vehicle 100.

The motor vehicle 100 is further equipped with at least one range-finding sensor (RADAR, LI DAR or SONAR). It is, more specifically here, equipped with five radar sensors 121, 122, 123, 124, 125 situated at the four corners of the motor vehicle and in a front central position of the motor vehicle.

The motor vehicle 100 is equipped also with a geolocation system 141, for example comprising a GNSS receiver (typically a GPS sensor).

In order to process the information supplied by these various components, the motor vehicle 100 is equipped with a computer 140.

This computer 140 comprises a processor (CPU), an internal memory, analogue-digital converters, and various input and/or output interfaces.

Using its input interfaces, the computer 140 can receive input signals from the various sensors.

The computer 140 is also connected to an external memory 142 which stores various data such as, for example, predetermined data which will be outlined hereinbelow.

The internal memory of the computer 140, for its part, stores a computer application, composed of computer programs comprising instructions, the execution of which by the processor allows the implementation by the computer 140 of the method described hereinbelow.

Finally, through its output interfaces, the computer 140 can transmit setpoints to different members of the motor vehicle. These members are, for example, an assisted steering actuator, a brake actuator, a speaker situated in the interior of the vehicle, a display screen situated in the interior of the vehicle, a vibrating motor situated in the steering wheel of the vehicle.

Figure 2:
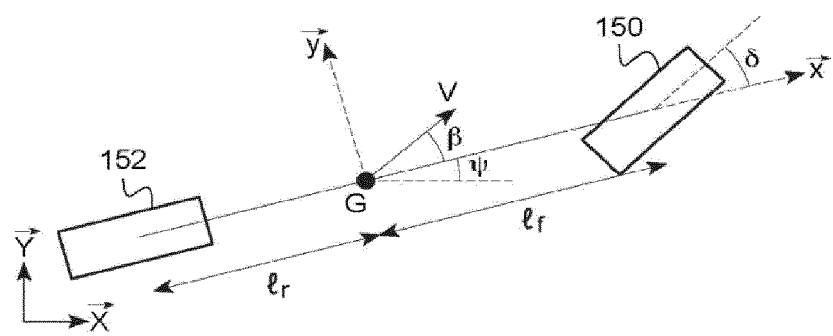
FIG. 2 is a representation of the "bicycle" model applied to the motor vehicle travelling in a traffic lane.

The trajectory of the motor vehicle 100 is modelled here by a so-called "bicycle" model. In the context of this model, as can be seen in FIG. 2, the motor vehicle 100 is represented by a frame and two wheels 150, 152 (as for a bicycle).

The model is described by the following system of equations:

$$\begin{cases} \dot{X} = V\cos(\psi + \beta(\delta)) \\ \dot{Y} = V\sin(\psi + \beta(\delta)) \\ \dot{\psi} = \dfrac{V}{l_r}\sin(\beta(\delta)) \end{cases} \qquad \text{[Math. 1]}$$

The variables considered in this model are as follows:

the variables X and Y which correspond to the coordinates of the center of gravity of the motor vehicle 100 in the reference frame (O, X, Y) (represented in FIG. 2), the variables V and dV/dt which correspond respectively to the speed and to the acceleration of the motor vehicle 100, a steering lock angle, denoted δ, of the front wheel 150, that is to say the angle that the front wheel 150 forms with the longitudinal axis of the motor vehicle 100, the variable dδ/dt corresponding to the rate of variation of the steering lock angle, the variable dθ/dt corresponding to the steering lock speed associated with the front wheel 150, the variable β(δ) defined as follows:

$$\beta(\delta) = a\tan\left(\tan\left(\delta\dfrac{l_r}{l_r + l_f}\right)\right), \qquad \text{[Math. 2]}$$

with $l_f$ and $l_r$ the respective distances between the center of gravity of the motor vehicle 100 and the front train and between the center of gravity of the motor vehicle 100 and the rear train, a yaw speed, denoted dψ/dt, of the motor vehicle 100, corresponding to the speed of rotation of the motor vehicle 100 about its center of gravity on a vertical axis, and a heading angle, denoted ψ, corresponding to the angle, called yaw angle, between the axis of the motor vehicle 100 and the tangent to the trajectory.

More details on this model can be found in the document "Cohérence et stabilité des systèrnes hiérarchiques de planification et de controle pour la conduite automatisée" (Coherence and stability of hierarchical planning and control systems for automated driving) by Philip Polack, Doctoral Thesis, Research University, Paris Sciences et Lettres, 2018.

The trajectory of the motor vehicle 100 is therefore defined by the set ξ defined by the equation:

$$\xi(t) = [X(t), Y(t), \psi(t), V(t), \delta(t)] \qquad \text{[Math. 3]}$$

For the rest of the explanation, the variable u(t)=[dV/dt, dδ/dt] is also defined.

The computer 140 is adapted to implement the method for determining a trajectory of the motor vehicle 100.

Figure 3:
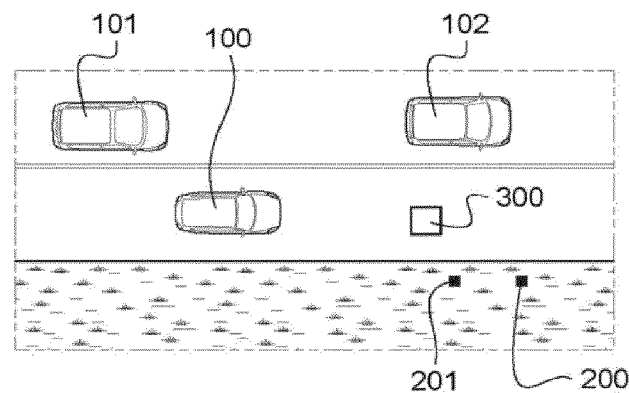
FIG. 3 is a schematic representation of the environment of the motor vehicle.

For the description of this method, the situation represented in FIG. 3 is considered as an illustrative example. The motor vehicle 100 is travelling on a road on which two other motor vehicles 101, 102 are also travelling. Two pedestrians 200, 201 are present on the sidewalk running along the road. Finally, an immobile object 300, for example a block 300, is placed on the traffic lane of the motor vehicle 100. This scene as a whole therefore constitutes the environment of the motor vehicle 100.

The method executed by the computer 140 is suitable for determining the trajectory that the motor vehicle 100 can take in order to minimize the risks of collision resulting in injuries with the other protagonists. More particularly, this method aims to minimize the risks of collision resulting in injuries between the motor vehicle 100 and the other protagonists on the road.

For that, the computer 140 implements a method comprising several steps, which are described hereinbelow.

Figure 4:
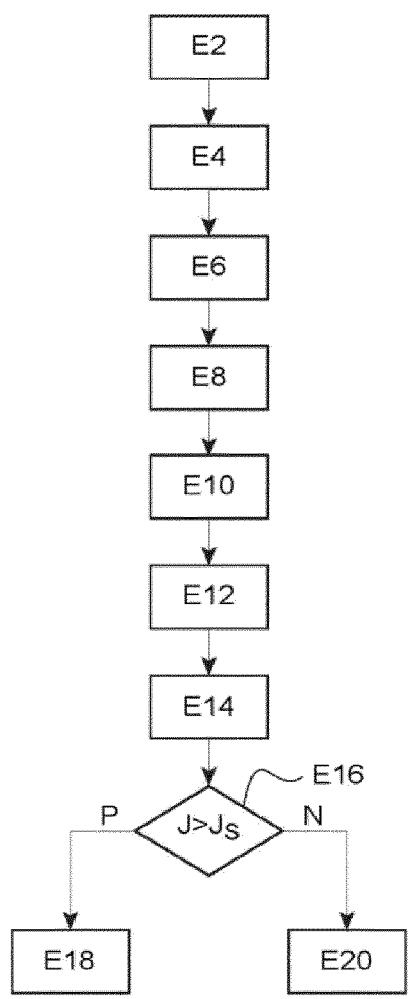
FIG. 4 represents, in flow diagram form, an example of the method according to the invention.

The succession of the steps implemented in the context of this method is represented in FIG. 4 in the form of a flow diagram.

Prior to the implementation of the method, it is assumed that the motor vehicle is travelling on a road, as in the example of FIG. 3.

Figure 6:
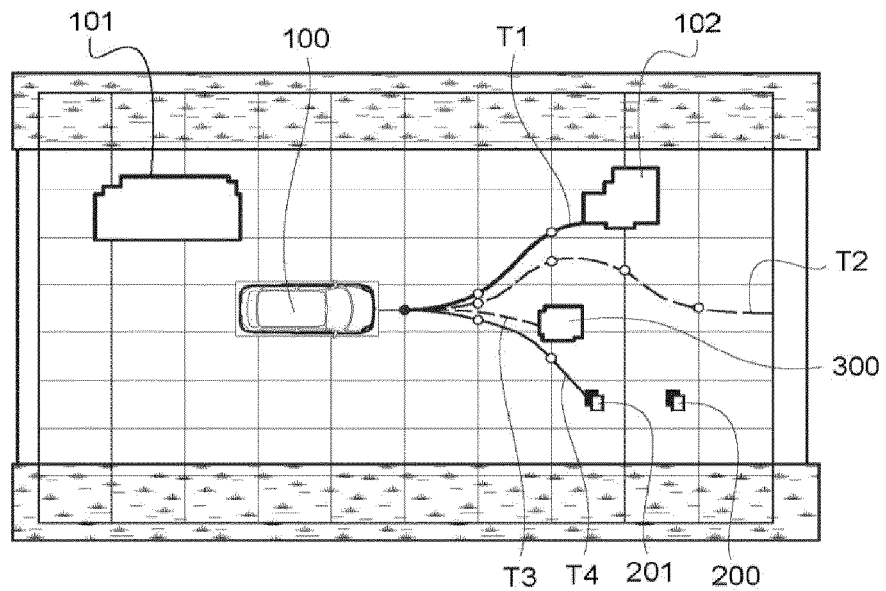
FIG. 6 is an example of possible trajectories for the motor vehicle.

As FIG. 4 shows, the method begins in the step E2 with the determination of a representation of the environment of the motor vehicle 100. As can be seen in FIG. 6, this representation of the environment of the motor vehicle 100 is, here, made in the form of a grid formed by a plurality of cells.

The environment of the vehicle is therefore defined here as all of the zone illustrated by the grid. This zone here preferentially has a rectangular form, of predetermined length and width. It can be of any other form, for example of circular form. The center of this zone is, here, situated in front of the vehicle. The characteristic dimensions of this zone (for example the length and the width in the case of a zone of rectangular form) can notably vary as a function of the speed of movement of the motor vehicle 100.

This representation comprises a data set characterizing the motor vehicle 100, for example the location of the motor vehicle 100, the kinematic data linked thereto such as, for example, its speed of movement, its acceleration, etc.

In the next step E4, the computer 140 identifies, from the data transmitted by the various sensors, a plurality of objects which are present in the environment of the motor vehicle 100. In the example represented in FIG. 3, the computer 140 identifies, in this step E4, the two other motor vehicles 101, 102, the two pedestrians 200, 201 and the object 300.

In this step, the data concerning these identified objects, in particular their location, their direction and their speed of movement, are then added to the representation of the environment of the motor vehicle 100.

The next step E6 then consists in determining, for each object identified in the step E4, the speed of impact $V_{impact}$ between the object concerned and the motor vehicle 100. In the example of FIG. 3, five speeds of impact are therefore determined in this step E6 (motor vehicle 100—motor vehicle 101, motor vehicle 100—motor vehicle 102, motor vehicle 100—pedestrian 200, motor vehicle 100—pedestrian 201 and motor vehicle 100—object 300).

The determination of each speed of impact $v_{impeot}$ is based on the "bicycle" model introduced previously. It is determined as a function of the data contained in the representation generated in the step E2. It is expressed in the form:

$$V_{impact} = V_{relative} \alpha_{vhc} T_{TC},  \quad [\text{Math. 4}]$$

with $V_{relative}$ the relative speed of movement of the motor vehicle 100 with respect to the object concerned (by calculation of the speed of impact), $a_{vhc}$ the acceleration of the motor vehicle 100 and $T_{TC}$, the time-to-collision between the object concerned and the motor vehicle 100.

The relative speed of movement and the acceleration of the motor vehicle 100 are obtained using the "bicycle" model introduced previously and are contained in the representation of the environment determined in the step E2.

The time-to-collision $T_{TC}$ is assessed from a two-dimensional model, from the speed vectors of the object concerned and of the motor vehicle 100. The method for calculating the time-to-collision $T_{TC}$ used is described in more detail in the document "On computing time-to-collision for automation scenarios", C. Schwarz, Transportation Research Part F: Traffic Psychology and Behaviour, Vehicle Automation and Driver Behaviour, vol. 27, pp. 283-294, 2014.

As FIG. 4 shows, the method is continued by a step E8. In this step, the computer 140 determines, for each object concerned, a risk of injury r associated with each type of object referenced. For example here, a risk of injury ($r_{vhc}$) for the vehicle-vehicle collision, another ($r_{pieton}$) for the vehicle-pedestrian collision and another ($r_{obi}$) for the vehicle-block collision are determined, bearing in mind that this risk of injury is determined for each speed of impact determined in the step E6.

Figure 5:
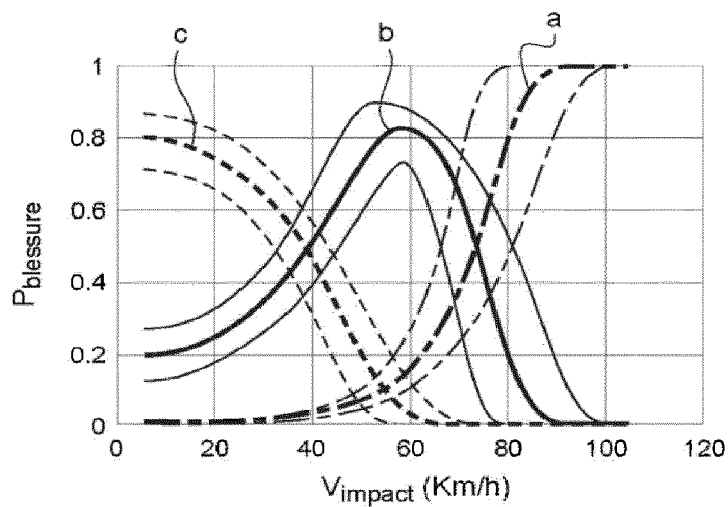
FIG. 5 is an example of a curve of injuries in the event of a collision between a pedestrian and a motor vehicle.

In practice, the risk of injury associated with each object is determined as a function of a plurality of data associated with each object. These predetermined data are derived from risk-of-injury curves constructed from accident statistics analysis data. FIG. 5 represents an example of a risk-of-injury curve in the case of a collision between a motor vehicle and a pedestrian. These risk-of-injury curves can be found notably in the document "A tool to assess pedestrian safety: Risk curves by injury severity and their confidence intervals for car-to-pedestrian front collision" by S. Cuny, E. L ecuyer, T. Hermitte, N. Bertholon and H. Chajmowicz, IRCOBI 2018 or the document "Association for the Advancement of Automotive Medicine: The Abbreviated Injury Scale 1990 Revision—Update 98. 1998", Barrington, Association for the Advancement of Automotive Medicine.

The risk-of-injury curves represent the probability of injury as a function of the speed of impact. In particular, the data derived from these risk-of-injury curves correspond to an illustration of the variation of the severity of the injury caused by the collision as a function of the speed of impact.

These risk-of-injury curves are established here, on the basis of statistical models, from French accident analysis data and distinguish the probability of slight injuries (requiring less than 24 hours of hospitalization or none at all), serious injuries (requiring 24 hours to 30 days of hospitalization), fatal injuries (linked to an accident within 30 days).

FIG. 5 therefore represents the respective variation of the probability of death (curve a), of the probability of serious injuries (curve b) and of the probability of slight injuries (curve c) as a function of the speed of impact in the case of a collision between a motor vehicle and a pedestrian. Each of the curves a, b and c is bracketed by two other curves which illustrate the uncertainties which are associated therewith.

Here, the three curves a, b and c are represented in the case of a collision between a motor vehicle and a pedestrian. Other curves a, b and c of different forms are also determined, in the same way, for the case of a collision between two motor vehicles and/or for the case of a collision between a motor vehicle and a fixed infrastructure of the environment. It would also be possible to envisage obtaining other curves for other particular cases (collision with a bicycle, with a motorcycle, etc.).

The risk of injury associated with each type of object (pedestrian, vehicle, infrastructure, etc.) is determined on the basis of these risk-of-injury curves and as a function of the determined speed of impact. More particularly, the risk of injury associated with each type of object referenced is determined by calculating a weighted sum of the probabilities of death, of serious injuries and of slight injuries associated with the determined speed of impact.

For example in the case of a collision between a motor vehicle and a pedestrian, at the determined speed of impact, the associated risk of injury is defined by the following formula:

$$r_{pedestrian} = w_{dec} \cdot p_{dec} + w_{blg} \cdot p_{blg} + w_{bll} \cdot p_{bll} \quad \text{[Math. 5]}$$

with $p_{dec}$, $p_{blg}$ and $p_{bll}$ respectively the probabilities of death, of serious injuries and of slight injuries associated with the determined speed of impact (and derived from risk-of-injury curves previously described) and $w_{dec}$, $W_{blg}$ and $w_{bll}$ are the respective weightings associated with these probabilities.

The values of these different weightings are determined as a function of social and ethical parameters. For example, they will make it possible to place a priority on certain objects over others. For example, it is possible to prioritize a collision on a fixed infrastructure or a motor vehicle with respect to a collision with pedestrians or cyclists.

These weightings make it possible to reflect the real situation of the collisions between the different types of objects. For example, upon a collision between a motor vehicle and a pedestrian at a speed of impact greater than 80 km/h, the probability of death of the pedestrian is very high compared to the probabilities of slight injuries or of serious injuries. These observed facts can therefore be reflected in the determination of the risk of injury, for example by attributing a higher weighting to the probability of death compared to the probabilities of serious injuries and of slight injuries in the case of a collision between a motor vehicle and a pedestrian at high impact speed.

In practice, the weightings are, for example, between 0 and 3. Preferably, they can be between 0 and 1 so as to obtain a normalized risk of injury.

As FIG. 4 shows, the method is continued with the step E10 in which, for each object identified in the step E4, a probability resulting in an injury between the object concerned and the motor vehicle 100 is determined.

This probability of collision resulting in an injury takes account of the position of the object in the environment of the motor vehicle 100 and of the risk of injury which is associated with this object. It is an indicator of the possible collisions with injuries which could occur between the motor vehicle 100 and this object present in its environment.

More particularly, this probability of collision is a function of the risk of injury associated with the object and determined in the step E8. It depends also on a probability of occupancy of a cell of the grid of the representation by the object concerned.

It is defined according to the following formula:

$$p_{col\_bls\_obj} = p_{occ} \cdot r_{obj} \quad \text{[Math. 6]}$$

with $p_{col\_bis\_obj}$ the probability of collision resulting in an injury between an object and the motor vehicle 100, $p_{occ}$ the probability of occupancy of a cell of the grid by the object concerned and rob; the risk of injury associated with this object (determined in the step E8).

Thus, for each cell of the grid representing the environment of the motor vehicle 100, an indication concerning a possible collision with injury with this vehicle is obtained through this probability.

This probability therefore depends on the location of the objects with respect to the motor vehicle 100. It is therefore higher (therefore close to 1) for the objects closest to the motor vehicle 100 than for the objects further away. That notably makes it possible to take account of the measurement uncertainties of the sensors.

Finally, at the end of the step E10, the representation grid of the environment of the motor vehicle 100 is complemented by taking account of the different values of probabilities of collision resulting in an injury, for all the objects identified in the environment of the motor vehicle 100.

The method is continued in the step E12 in which the computer 140 determines a plurality of possible trajectories for the motor vehicle 100. This plurality of trajectories is determined for a time window of the order of a few seconds (for example, of the order of four seconds).

"Possible trajectories" are understood to mean the trajectories that the motor vehicle 100 could take by maneuvering in a reasonable manner. For example, a trajectory whereby the motor vehicle 100 would be moving in reverse is not considered as a possible trajectory.

Thus, in the step E12, a predefined number of trajectories that the motor vehicle 100 could take from the initial position at which it is located at t=0 is determined. This plurality of trajectories is determined by using the bicycle model described previously, over the time window previously introduced and by imposing the initial position of the motor vehicle 100. This predefined number of trajectories depends therefore also on the speed of movement of the motor vehicle 100.

FIG. 6 represents, by way of example, four possible trajectories T1, T2, T3, T4.

One of the main objectives of the invention is therefore to determine, out of this plurality of possible trajectories, the one which will minimize the probability of collision resulting in an injury.

Thus, in the step E14, the computer 140 determines the trajectory to be taken by the motor vehicle 100. This trajectory to be taken is determined by optimizing a cost function J. The optimizing of the cost function J then makes it possible to minimize the risks of collision resulting in an injury between the motor vehicle 100 and each identified object.

This cost function J is defined by the following formula:

$$J = \Sigma_{obj}[p_{col\text{-}bis\text{-}obj}(x(t),Y(t)) + \eta \cdot L_{p\text{-}obj}(x(t),Y(t)) + y \cdot u(t)] \quad \text{[Math. 7]}$$

with $p_{col\text{-}bis\text{-}obj}$ the probability of collision resulting in an injury for each object identified in the environment of the motor vehicle 100, $L_{p\text{-}obj}$ the distance between the motor vehicle 100 and each object and n and y predetermined constants.

This cost function depends therefore on the probabilities of collision determined in the step E10 previously described. It depends also on the kinematic data of the motor vehicle 100, on the distance between the motor vehicle 100 and each object present in the environment of the motor vehicle 100.

The cost function J therefore takes into account, for all of the objects identified in the environment of the motor vehicle 100 and for each trajectory determined in the step E12, the probability of collision resulting in an injury as well as the distance separating each object from the motor vehicle 100. The value of the cost function therefore quantifies the risks of collision with injury of the determined trajectories. The greater the number of trajectories with risks of collision resulting in an injury, the higher the value of the cost function.

In practice, the optimizing of the cost function J is performed so as to satisfy at least one dynamic constraint of the motor vehicle 100.

Here, seven dynamic constraints must be satisfied in the optimizing of the cost function J.

These seven dynamic constraints are expressed in the form:

$$\dot{\xi}=f(\xi(t),u(t)) \forall t \in [0,T], (C1)$$ [Math. 8]

$$\xi=\xi_0, (C2)$$ [Math. 9]

$$|(X(T),Y(T))-(X,Y)_{but}|<\in,(C3)$$ [Math. 10]

$$\delta_{min} \leq \delta \leq \delta_{max}, (C4)$$ [Math. 11]

$$\dot{\theta}_{min} \leq \dot{\theta} \leq \dot{\theta}_{max}, (C5)$$ [Math. 12]

$$\sqrt{\alpha_x^2+\alpha_y^2} < \mu g, (C6)$$ [Math. 13]

with ax and ay the longitudinal and transverse components of the acceleration, g the acceleration of gravity and μ the friction coefficient of the ground.

$$(X(t),Y(t)) \leq (X_{grille}, Y_{grille}) \forall t \in [0,T], (C7).$$ [Math. 14]

The constraint (C1) makes it possible to ensure that the trajectory corresponds to the dynamics of the motor vehicle 100. In other words, the constraint (C1) makes it possible to ensure that the trajectory obtained conforms to the bicycle model used to describe the movement of the motor vehicle 100.

The constraint (C2) sets the initial state of the motor vehicle 100. This initial state is that listed in the representation of the environment as location of the motor vehicle 100.

The condition (C3) defines the final position of the object (denoted $(X, Y)_{but}$). This final position corresponds, in the case of a trajectory without collision, to an optimal position of the motor vehicle 100, after having avoided all the objects present in the environment (position of the motor vehicle at the instant t=T). In the case of a trajectory with collision, the final position of the motor vehicle 100 corresponds to a position close to that of the object with which the motor vehicle 100 has collided.

The conditions (C4) and (C5) impose constraints (minimum and maximum) respectively on the steering lock angle and speed. Limitations are imposed on these parameters by the mechanical characteristics of the motor vehicle 100 (it will not for example be possible to impose a steering lock angle greater than 60 degrees).

The condition (C6) imposes a constraint as to the tire load capacity (by defining a constraint on the components ax and ay of the acceleration of the vehicle). This constraint reflects the fact that the maximum longitudinal braking acceleration depends on the transverse acceleration. In other words, this condition notably makes it possible to take account of the fact that it is not possible to brake as much in a curve as in a straight line.

Finally, the condition (C7) makes it possible to ensure that the trajectory is a real trajectory (therefore contained within the representation grid defined by the coordinates of its ends $X_{grille}$ and $Y_{grille}$).

In practice here, the determination of the trajectory to be taken is based on a minimizing of the cost function J. In fact, according to the definition used here for the cost function J, the latter will be all the greater when the risk of injury caused by the collision between the object and the motor vehicle 100 is great.

The trajectory to be taken by the motor vehicle 100 is therefore that which minimizes the cost function J while satisfying the constraints (01) to (C7) set out previously.

This trajectory to be taken is displayed inside the motor vehicle 100 so as to be visible by the driver. It is for example displayed on the screen of a human-machine interface disposed inside the motor vehicle 100.

In the case of an autonomous vehicle, the trajectory to be taken (and displayed) is imposed for the movement of the motor vehicle 100. In practice, a control setpoint based on the trajectory to be taken is transmitted to an autonomous driving module which controls the trajectory to be followed.

In the example of FIG. 6, the trajectory T2 is the trajectory which minimizes the cost function J. It corresponds also to a trajectory without collision.

In an example in which all the trajectories would result in a collision, the trajectory chosen will be that which minimizes the risks of injuries and of death.

In the case where the trajectory to be taken leads inevitably to a collision, the method is continued with the step E16 in which the cost function is compared to a predetermined threshold. This predetermined threshold corresponds to an alert threshold Js from which the driver of the motor vehicle 100 must be alerted to the imminence of a collision with strong risks of injuries. This alert threshold depends also on an average reaction time available to the driver of the motor vehicle 100. This average reaction time is, here, of the order of a few seconds, for example approximately 2 seconds.

If the cost function J is above this alert threshold Js, the method is continued in the step E18 in which the driver receives an alert as to the imminence of a collision with an object in his or her environment and that risks resulting in injuries. This alert is, here, audible (via the vehicle speakers), haptic (via vibrations of the steering wheel) or visual (via the display screen), as a function of a danger threshold associated with the trajectory determined in the step E14.

If the cost function is below this alert threshold Js, the method is continued in the step E20 during which the driver continues driving his or her vehicle without being alerted as to his or her environment.

The invention therefore makes it possible to mitigate the severity of the collision when a collision is unavoidable, the overall set of the risks of injuries caused in the event of collision being used as constraint for the cost function. The overall approach of the invention makes it possible to take into consideration all the objects in the scene to calculate the overall risk associated with the corresponding avoidance maneuvers in the event of collision between the ego and each object. Unlike a decision matrix, which uses predefined trajectories or scenarios, the invention explores the accessible space of the vehicle for the constraints considered, which makes it possible to determine a custom trajectory, the optimized determined trajectory being the best suited to the context. The use of the speed of impact to determine the risk of injury associated with each object by using the risk-of-injury curves (also called severity curves) makes it possible to determine a probability of collision associated with the risk of injury which provides a more qualitative measurement than a weight set per object and which constitutes a datum that can easily be used in the context of an overall approach, unlike zones of influence for example.

The invention claimed is:

1. A method for determining a trajectory of a motor vehicle, comprises:
    identifying, via a computer in the motor vehicle, objects present in an environment of the motor vehicle, the identifying including for each identified object:
        a) determining a distance between the motor vehicle and the object using a range-finding sensor disposed on the motor vehicle,
        b) determining a speed of impact between the object and the motor vehicle,
        c) determining a risk of injury in an event of collision between the object concerned and the motor vehicle at the determined speed of impact, and
        d) determining a probability of collision resulting in an injury as a function of the determined risk of injury, then
    determining a trajectory to be taken by the motor vehicle by optimizing a cost function which depends on determined probabilities of collision resulting in an injury and which makes it possible to minimize the risk of collision resulting in an injury between each object and the motor vehicle;
    transmitting the trajectory to be taken to a processing circuitry configured to perform autonomous driving; and
    autonomously modifying a current trajectory of the motor vehicle into the trajectory to be taken with the processing circuitry,
    wherein said probability of collision resulting in an injury is a function of a distance separating the motor vehicle and said object, said probability of collision resulting in an injury being calculated as a function of a probability of occupancy of a cell of a grid by said object, said grid comprising a plurality of cells representing the environment of the motor vehicle,
    wherein the risk of injury associated with each object is determined as a function of a plurality of data which correspond respectively to probabilities of the injury being more or less serious, each probability depending on a nature of the identified object, and
    wherein said plurality of data comprises a probability of death, a probability of serious injury and a probability of slight injury, and wherein the risk of injury associated with each object is determined by calculating a weighted sum of the probabilities of death, of serious injuries and of slight injuries associated with the determined speed of impact.

2. The method as claimed in claim 1, wherein the cost function depends on kinematic data of the motor vehicle, on a distance between the motor vehicle and each object, and on the probability of collision resulting in an injury determined for each object.

3. The method as claimed in claim 1, wherein the optimizing of the cost function is performed so as to observe at least one constraint relating to dynamic characteristics of the motor vehicle.

4. The method as claimed in claim 1, wherein the determining the trajectory to be taken by the motor vehicle is based on a minimizing of the cost function, said cost function being higher when the risk of injury caused in the event of collision is great.

5. A method comprising:
    the method as claimed in claim 1; and
        displaying the trajectory to be taken on a screen inside the motor vehicle for a driver.

6. The method as claimed in claim 5, further comprising:
    alerting the driver of the motor vehicle implemented by the computer as a function of the risk of collision or of injury caused by a collision between the object and the motor vehicle.

7. The method as claimed in claim 6, wherein the alerting is performed when the cost function is above a predetermined threshold.

8. The method as claimed in claim 7, wherein the alerting comprises emission of an audible or haptic or visual alert.

9. The method as claimed in claim 1, wherein the risk of injury is determined for the speed of impact relative to an impacted object type with a risk-of-injury curve.

10. A method for determining a trajectory of a motor vehicle, comprises:
    identifying, via a computer in the motor vehicle, objects present in an environment of the motor vehicle, the identifying including for each identified object:
        a) determining a distance between the motor vehicle and the object using a range-finding sensor disposed on the motor vehicle,
        b) determining a speed of impact between the object and the motor vehicle,
        c) determining a risk of injury in an event of collision between the object concerned and the motor vehicle at the determined speed of impact, and
        d) determining a probability of collision resulting in an injury as a function of the determined risk of injury, then
    determining a trajectory to be taken by the motor vehicle by optimizing a cost function which depends on determined probabilities of collision resulting in an injury and which makes it possible to minimize the risk of collision resulting in an injury between each object and the motor vehicle;
    transmitting the trajectory to be taken to a processing circuitry configured to perform autonomous driving;
    autonomously modifying, by the processing circuitry, a current trajectory of the motor vehicle into the trajectory to be taken,
    wherein said probability of collision resulting in an injury is a function of a distance separating the motor vehicle and said object, said probability of collision resulting in an injury being calculated as a function of a probability of occupancy of a cell of a grid by said object, said grid comprising a plurality of cells representing the environment of the motor vehicle,
    wherein the risk of injury associated with each object is determined as a function of a plurality of data which correspond respectively to probabilities of the injury being more or less serious, each probability depending on a nature of the identified object, and
    wherein said plurality of data comprises a probability of death, a probability of serious injury and a probability of slight injury, and wherein the risk of injury associated with each object is determined by calculating a weighted sum of the probabilities of death, of serious injuries and of slight injuries associated with the determined speed of impact.

11. The method of claim 10, wherein the risk of injury associated with each object is determined as a function of a plurality of data which correspond respectively to probabilities of the injury being more or less serious, each probability depending on a nature of the identified object.

12. The method of claim 11, wherein said plurality of data comprises a probability of death, a probability of serious injury and a probability of slight injury, and wherein the risk of injury associated with each object is determined by calculating a weighted sum of the probabilities of death, of serious injuries and of slight injuries associated with the determined speed of impact.

13. The method of claim 10, wherein the cost function depends on kinematic data of the motor vehicle, on a distance between the motor vehicle and each object, and on the probability of collision resulting in an injury determined for each object.

14. The method of claim 10, wherein the optimizing of the cost function is performed so as to observe at least one constraint relating to dynamic characteristics of the motor vehicle.

15. The method of claim 10, wherein the determining the trajectory to be taken by the motor vehicle is based on a minimizing of the cost function, said cost function being higher when the risk of injury caused in the event of a collision is great.

16. The method of claim 10, wherein the risk of injury is determined for the speed of impact relative to an impacted object type with a risk-of-injury curve.

* * * * *